(12) United States Patent
Riley et al.

(10) Patent No.: US 9,354,336 B2
(45) Date of Patent: May 31, 2016

(54) MICROSEISMIC DATA ACQUISITION ARRAY AND CORRESPONDING METHOD

(75) Inventors: Duncan W. Riley, Houston, TX (US); Thomas John Fleure, Missouri City, TX (US); John F. Gillooly, Jr., Katy, TX (US); Charles John Sicking, Plano, TX (US)

(73) Assignee: Global Ambient Seismic, Inc., Missouri City, TX (US)

( * ) Notice: Subject to any disclaimer, the term of this patent is extended or adjusted under 35 U.S.C. 154(b) by 569 days.

(21) Appl. No.: 13/277,189

(22) Filed: Oct. 19, 2011

(65) Prior Publication Data

US 2013/0100769 A1   Apr. 25, 2013

(51) Int. Cl.
*G01V 1/20* (2006.01)

(52) U.S. Cl.
CPC .......................................... *G01V 1/20* (2013.01)

(58) Field of Classification Search
CPC .................................. G01V 1/20; G01V 1/003
USPC ........................................................ 367/56, 58
See application file for complete search history.

(56) References Cited

U.S. PATENT DOCUMENTS

| | | | | |
|---|---|---|---|---|
| 3,964,021 | A | * | 6/1976 | Tamches .................. G06K 9/56 382/259 |
| 4,305,141 | A | * | 12/1981 | Massa .................... B60B 1/0607 367/105 |
| 4,476,552 | A | | 10/1984 | Waters et al. |
| 4,893,025 | A | * | 1/1990 | Lee ........................ B25J 13/086 250/208.3 |
| 5,029,145 | A | | 7/1991 | Marsden |
| 5,148,407 | A | * | 9/1992 | Haldorsen et al. ............... 367/32 |
| 5,402,391 | A | | 3/1995 | Cordsen |
| 5,598,378 | A | | 1/1997 | Flentge |
| 5,787,051 | A | | 7/1998 | Goodway et al. |
| 5,963,879 | A | * | 10/1999 | Woodward et al. ............. 702/17 |
| 6,028,822 | A | | 2/2000 | Lansley et al. |
| 6,226,601 | B1 | * | 5/2001 | Longaker ........................ 702/79 |
| 6,389,361 | B1 | | 5/2002 | Geiser |
| 6,868,037 | B2 | | 3/2005 | Dasgupta et al. |
| 7,127,353 | B2 | | 10/2006 | Geiser |
| 7,663,970 | B2 | | 2/2010 | Duncan et al. |

(Continued)

FOREIGN PATENT DOCUMENTS

JP   2009017469 A   *   1/2009
WO   WO9742525       5/1997

OTHER PUBLICATIONS

3-D symmetric sampling Vermeer, Gijs V. O. Geophysics, vol. 63, No. 5 (Sep.-Oct. 1998); p. 1629-1647.

(Continued)

*Primary Examiner* — Ian J Lobo
(74) *Attorney, Agent, or Firm* — Edward Eugene Thigpen (57) ABSTRACT

Disclosed are various embodiments of methods, devices and systems for performing a microseismic survey. According to some embodiments, microseismic signals are detected at seismic sensor stations deployed in two sets of seismic sensor lines, the seismic sensor lines within each set being substantially parallel to one another and the two sets of seismic sensor lines being mutually orthogonal. According to other embodiments, microseismic signals are detected at seismic sensor stations deployed in a hexagonal pattern. Such sensor geometries offer advantages over linear or radial arrays, including noise reduction, data acquisition flexibility as new wells are added to the survey area, and an improved distribution of data points above points in the subsurface.

5 Claims, 9 Drawing Sheets

(56) References Cited

U.S. PATENT DOCUMENTS

| | | | |
|---|---|---|---|
| 7,768,872 B2* | 8/2010 | Kappius et al. | 367/56 |
| 2004/0008580 A1* | 1/2004 | Fisher et al. | 367/56 |
| 2004/0034472 A1* | 2/2004 | Tokimatsu et al. | 702/2 |
| 2008/0106973 A1* | 5/2008 | Maisons | 367/25 |
| 2009/0299637 A1* | 12/2009 | Dasgupta | 702/12 |
| 2012/0243368 A1* | 9/2012 | Geiser et al. | 367/9 |
| 2013/0208126 A1* | 8/2013 | Barrett | G06K 9/58 348/169 |

OTHER PUBLICATIONS

A comparison of two different approaches to 3D seismic survey design Vermeer, Gijs V. O. CSEG Recorder Apr. 2004, p. 42-45.

U.S. Appl. No. 13/070,442, filed Mar. 23, 2011, Geiser et al.

* cited by examiner

MICROSEISMIC DATA ACQUISITION ARRAY AND CORRESPONDING METHOD

FIELD

Various embodiments described herein relate to the field of seismic data acquisition and processing, and devices, systems and methods associated therewith.

BACKGROUND

In recent years the technique of hydraulic fracturing has become widely used for recovery of hydrocarbon reserves, and in particular, of natural gas from shale formations deep underground. Monitoring the progress of the fracturing is important for technical and environmental reasons. One method of monitoring the fracturing process in close to real time uses the energy released by the fracturing of the geologic formation under very high pressure. This energy can be detected as seismic waves, which are recorded as digital data. Such seismic waves possess relatively low energy when compared to those generated by earthquakes or conventional seismic surveying with impulsive or vibratory sources, and as a result, this branch of geophysics is therefore referred to as "microseismic".

Because the seismic energy released by microseismic events is so low, any reduction in noise levels provides advantages in data processing and identification of microseismic events. Various techniques are available for filtering noise, but many rely either on being able to identify the noise from a characteristic pattern exhibited at different sensor locations at different times, or on noise being cancelled out when data from multiple sensor locations are stacked. Some sensor geometry arrays have been used to reduce noise levels, but in many such approaches, such as star or radial arrays, it is assumed that noise originates at one point, usually in the well in which the fracturing operation is taking place. This is not always the case, however, as noise may originate from many sources. When a second or subsequent well is drilled, a new array has to be laid out that is centered on the new well.

What is required is a generalized and flexible sensor array geometry, with the orientation of the sensor lines and the sensor spacing designed to provide the information required to discriminate against various forms of noise originating at multiple locations, and to enhance weak microseismic signals.

SUMMARY

In one embodiment, there is provided a sensor array for performing a microseismic survey, comprising; a first plurality of sensor locations, the first plurality of sensor locations being substantially equally spaced at a first sensor spacing along a first plurality of sensor lines, the first plurality of sensor lines being substantially parallel to one another and substantially equally spaced from one another at a first sensor line spacing; a second plurality of sensor locations, the second plurality of sensor locations being substantially equally spaced at a second sensor spacing along a second plurality of sensor lines, the second plurality of sensor lines being substantially parallel to one another and substantially equally spaced from one another at a second sensor line spacing; wherein the sensor lines in the second plurality of sensor lines are substantially orthogonal to the sensor lines in the first plurality of sensor lines In a further embodiment, there is provided a method of performing a microseismic survey, comprising; detecting the microseismic signals at a first plurality of sensor locations, the first plurality of sensor locations being substantially equally spaced at a first sensor spacing along a first plurality of sensor lines, the first plurality of sensor lines being substantially parallel to one another and substantially equally spaced from one another at a first sensor line spacing; detecting the microseismic signals at a second plurality of sensor locations, the second plurality of sensor locations being substantially equally spaced at a second sensor spacing along a second plurality of sensor lines, the second plurality of sensor lines being substantially parallel to one another and substantially equally spaced from one another at a second sensor line spacing, wherein the sensor lines in the second plurality of sensor lines are substantially orthogonal to the sensor lines in the first plurality of sensor lines.

In another embodiment there is provided a sensor array for performing a microseismic survey, comprising; a plurality of sensor locations, the plurality of sensor locations being substantially equally spaced at a predetermined sensor spacing, each sensor location being equidistant from up to six other sensor locations at the vertices of a hexagon centered about the sensor locations.

In yet another embodiment there is provided a method of performing a microseismic survey, comprising; detecting the microseismic signals at a first plurality of sensor locations, the plurality of sensor locations being substantially equally spaced at a predetermined sensor spacing, each sensor location being equidistant from up to six other sensor locations at the vertices of a hexagon centered about the sensor location.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

The drawings are not necessarily to scale. Like numbers refer to like parts or steps throughout the drawings, unless otherwise noted.

DETAILED DESCRIPTIONS OF SOME EMBODIMENTS

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well known methods, processes and devices and systems finding application in the various embodiments described herein are not disclosed in detail.

In the drawings, some, but not all, possible embodiments are illustrated, and further may not be shown to scale.

Some of the drawings and descriptions thereof are provided as examples of simplified data acquisition geometries to assist the reader in understanding the concepts of microseismic data acquisition, and are not to be taken as limitations on the devices, systems and methods described herein.

For the first 100 years and more of oil exploration and production, wells were drilled almost exclusively in geologic formations that permitted production of oil and gas flowing under the natural pressures associated therewith. Such production required that two physical properties of the geologic formation fall within certain boundaries. The porosity of the formation had to be sufficient to allow a substantial reserve of hydrocarbons to occupy the interstices of the formation, and the permeability of the formation had to be sufficiently high that the hydrocarbons could move from a region of high pressure to a region of lower pressure, such as when hydrocarbons are extracted from a formation. Typical geologic formations having such properties include sandstones.

In recent years, it has become apparent that large reserves of hydrocarbons are to be found in shale formations. Shale formations are typically not highly permeable, and therefore present formidable obstacles to production. The most common technique in use today that permits economic production of hydrocarbons, and especially natural gas from shale formations, is hydraulic fracturing. This technique can be also be applied to older wells drilled through non-shale formations to increase the proportion of hydrocarbons that can be extracted from them, thus prolonging well life.

Hydraulic fracturing involves pumping fluid under very high pressure into hydrocarbon-bearing rock formations to force open cracks and fissures and allow the hydrocarbons residing therein to flow more freely. Usually the fluids injected into such formations contain chemicals to improve flow, and also contain "proppants" (an industry term for substances such as sand). When the fracturing fluid is removed, and the hydrocarbons are allowed to flow, the sand grains prop open the fractures and prevent their collapse, which might otherwise quickly stop or reduce the flow of hydrocarbons.

Drilling technology has evolved to allow wells to be drilled along virtually any direction or azimuth, and is no longer constrained to the drilling of vertical wells only. Deviated wells are thus often drilled along specific geologic formations to increase production potential. The extent of a hydrocarbon-producing formation in a vertical well may be measured in feet, or perhaps tens or hundreds of feet in highly productive areas. The maximum area of the formation in contact with the vertical well bore may be quickly computed as the circumference of the well multiplied by the height of the producing formation. In practice, the producing area is much less than this figure. By drilling horizontally or non-vertically through a formation, the extent of the formation in contact with the wellbore can be much greater than is possible with vertically-drilled wells. Injecting deviated wells with hydraulic fracturing fluid can result in the propagation of fractures outwardly from the wellbore, and thereby increase significantly the total volume of the subsurface from which the hydrocarbons can be extracted.

The progress of a fracturing operation must be monitored carefully. Well fracturing is expensive, and the fracturing process is frequently halted once its benefits become marginal. The high pressures associated with fracturing result in fractures that tend to follow existing faults and fractures, and can result in an uneven or unpredictable fracture zone. Fracturing fluid may also begin following an existing fault or fracture zone and then propagate beyond the intended fracture zone. Care must also be taken not to interfere with existing production wells in the area. For these and other reasons, it is important that the fracturing operator be permitted to follow accurately the progress of the fluid front in the subsurface while the fluid is being injected into the well.

Conventional surface seismic reflection surveys generally do not work well for monitoring the movement or positions of fluid fronts in the subsurface. The physical dimensions of fractures are often shorter than can be detected using conventional surface seismic reflection techniques. In addition, within a given formation there may be no or low contrasts in seismic velocity, and as a result surface seismic reflection techniques cannot be used effectively to image fractures within the formation. Fractures also tend to scatter seismic energy, further obscuring their detection by conventional surface seismic reflection means.

An alternative approach to the problem of imaging factures or fluid fronts within formations known as "microseismicity" has its origins in earthquake seismology and in technology developed to monitor nuclear tests. Instead of using "active" surface seismic energy sources, "passive seismic" techniques are used to detect seismic energy generated in the subsurface of the earth. Seismic energy emitted by fracturing a geologic formation, which is caused by the injection of high pressure fracturing fluid into the formation, is sensed and recorded. The objective then becomes determining the point of origin of the emitted seismic energy, which defines the location of the fracture.

One method of locating fractures and faults in geologic formations is known as Seismic Emission Tomography (SET). Examples of SET techniques and processes are described in U.S. Pat. No. 6,389,361 to Geiser entitled "Method for 4D permeability analysis of geologic fluid reservoirs" (hereafter "the '361 patent") and in U.S. Pat. No. 7,127,353 to Geiser entitled "Method and apparatus for imaging permeability pathways of geologic fluid reservoirs using seismic emission tomography" (hereafter "the '353 patent"), the disclosures of which are hereby incorporated by reference herein in their respective entireties.

The SET process entails recording microseismic data using an array of sensors, which are typically located on or near the surface of the earth. Data are recorded over a given time period, with the duration of recording and the sampling interval being controlled by the objectives of the seismic data acquisition process, the characteristics of the events that generate the detected or sensed seismic energy, the distances involved, the characteristics of the subsurface, and other factors. The data recorded at each sensor location are then filtered and processed using SET processing techniques and software, which convert the data into a series of gridded subsurface volumes corresponding to multiple time samples. The values of the points in the grid represent given attributes of the data, which values vary over time as the energy emitted at each point in the subsurface varies.

Conventional seismic surveys use an active source to send energy into the subsurface of the earth. The timing and characteristics of such energy sources are well known. In contrast, microseismic surveys rely on energy from small and usually unpredictable movements of the subsurface, which is orders of magnitude lower than the energy produced by conventional seismic sources, and is often buried in random background noise. Because of the low level of microseismic energy, it can also be masked by other forms of noise, such as that generated by drilling operations, and even by the noise associated with the fracturing operations, such as the noise of the generators, pumps, trucks, etc. Some of this noise can be filtered out by particular arrangements of microseismic sensors. As the noise travels outwards from the point of origin, it arrives at different sensor locations at different times, and can often be identified and removed using techniques well known in the art, including, but not limited to, frequency filtering and frequency-wave number filtering. Wave number is the reciprocal of the spatial sampling of a data set, in the same way that frequency is the reciprocal of time sampling. Just as the frequency spectrum of a time series may be computed using a Fourier Transform and certain frequencies filtered therefrom, so may data be spatially processed using Fourier Transforms, and specific wave number ranges filtered out or passed through a filter.

Application of these filtering techniques requires adequate spatial sampling of the noise, analogous to the requirement for adequate sampling in the time domain to perform frequency filtering. The distance between sensors is therefore constrained by the spatial wavelengths of the noise which is to be attenuated.

Figure 1:
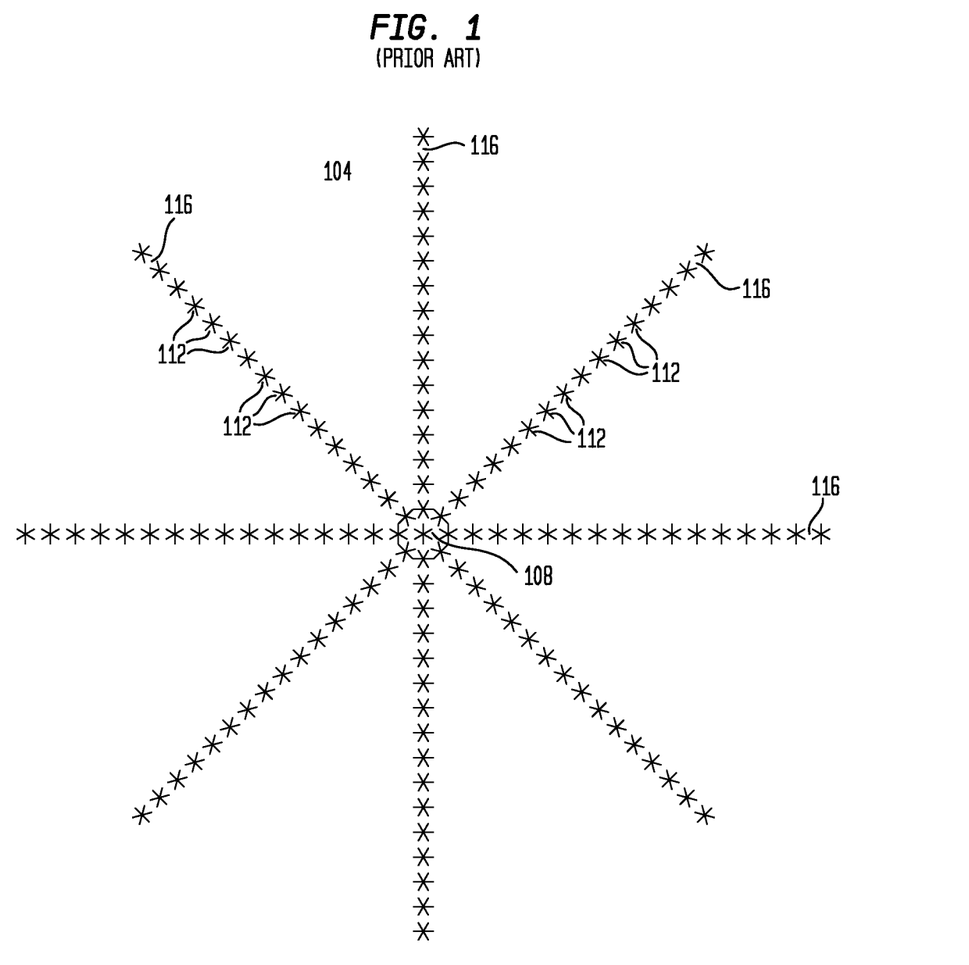
FIG. 1 shows a radial or star sensor array centered on a well location.

One common method of acquiring microseismic data is to arrange sensors in a star or radial pattern centered on the well where the fracturing operation to be performed, as shown in FIG. 1, about which more is said later. This method can be effective for noise originating at the center of the array and moving progressively outwards, reaching each sensor in turn along the arms of the array. The noise at one sensor may be removed using data from such sensor and the other sensors in the same arm of the array. However, the star array is not as useful for eliminating noise not originating at the well bore. For example, there may be other wells being drilled, or there may be fracturing fluid being pumped back from other wells. Production from existing wells generates noise at the surface and in the subsurface. Generators, pumps, wind turbines, and other oilfield and farm equipment may produce significant amounts of noise at multiple locations. Noise from each of these sources radiates out from its point of origin, crossing the star array at various angles rather than traveling in a radial direction along the arms of the array. This prevents the easy removal of noise at a sensor location using data from other sensors in the same arm of the star array.

Ambient noise, the normal "background" noise from the subsurface of the earth, can also pose problems when processing microseismic data. Naturally occurring earth movements, including small earthquakes and fracturing of geologic layers under stress, can cause a low level of substantially random seismic energy to be present. Because the seismic energy released during a fracturing operation is so low, various methods must be employed to distinguish microseismic signals from noise. These methods usually involve summing or "stacking" multiple data sets recorded over relatively long periods of time. A data set recorded over a period of time at a sensor location is referred to as a "trace". When processing microseismic data, the subsurface within the area of interest is divided into a 3D grid, each cell or voxel within the grid representing a possible location of the source of a seismic event. Using a known or estimated velocity model, and azimuthal information, for each point in the subsurface the travel time and travel path to each sensor is computed. For each point in the subsurface grid, the trace recorded at each of N sensor locations has the appropriate travel time shift applied thereto. The result is a set of N traces which may be considered to have originated at the voxel in question. Such traces are stacked or summed, or some measure of similarity or coherence, such as semblance, is computed. If the voxel indeed represents the origin of a microseismic event, the traces add constructively or show a high degree of similarity. In some embodiments, signals add while noise cancels, because noise is recorded at different times on different traces. Microseismic events can then be imaged and identified using techniques such as those described in the foregoing '353 and '361 patents.

Referring now to FIG. 1, there is shown radial or star array 104 centered at well location 108, which contains a plurality of sensors 112 arranged in radial lines 116. Radial array 104 may be substantially symmetrical as shown in FIG. 1. It is also possible to design an asymmetric radial array, with the lengths of radial lines 116 varying for each direction, and the angles between radial lines 116 being unequal. Radial lines 116 may be arranged to avoid surface constraints on where sensors can be placed, such as buildings, roads or unfavorable terrain, or to avoid noisy machinery such as pumps, generators, and other equipment commonly found in the vicinity of oil and gas wells. Further, radial lines 116 may be placed proximate the surface of the earth over existing or planned horizontal wells drilled starting from the vertical well at well location 108. Array 104 may be configured to follow the geology of the subsurface, when, for example, the principal fracture direction of an area is already known, and the arms of the array are aligned with such direction. Array 104 may also be modified to place more emphasis on recording data on the surface directly above a horizontal well bore which is to be hydraulically fractured. One advantage of the array 104 geometry is efficient discrimination against noise originating at well location 108. One disadvantage of the array geometry 104 shown in FIG. 1 is that it may not be effective at discriminating against noise arriving at sensors from directions other than from well location 108, including noise from other wells, oilfield equipment or industrial or farm machinery. An additional problem with designing array geometries to cover horizontal well bores is that as more horizontal well bores are drilled off a vertical well bore in different directions, the array geometry is no longer optimal and may have to be modified with additional sensor locations, or arms. In addition, if more vertical well bores are drilled, then a radial array will not be centered on the new well bores, limiting its usefulness and possibly requiring the placement of more sensors in a radial array for each of the new wells. After several wells have been drilled in an area, multiple overlapping star arrays may result.

To understand the limitations of methods currently in use, and the benefits of at least some of the embodiments described herein, it is helpful to understand the context in which a sensor array is used to record microseismic data.

Figure 2:
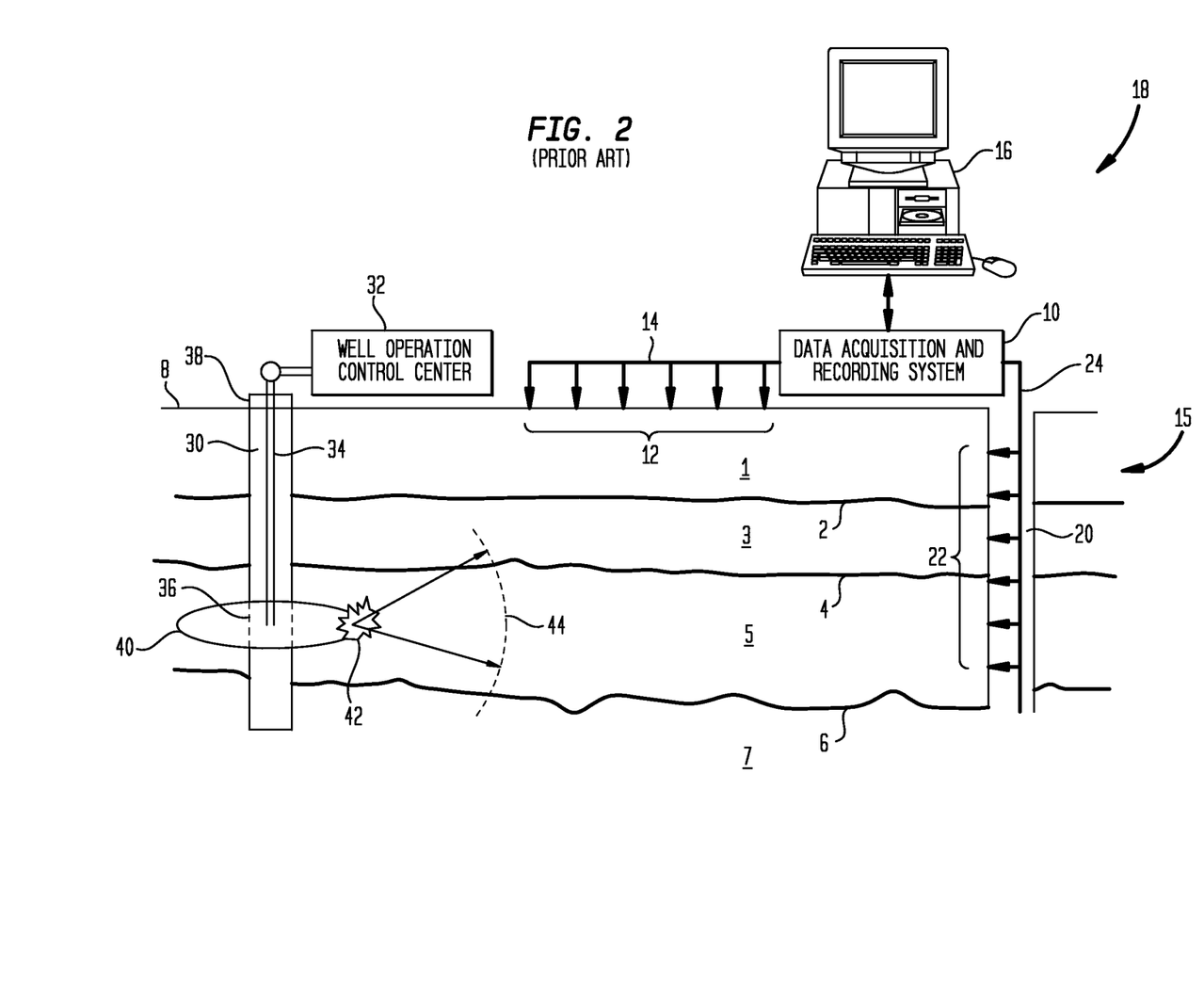
FIG. 2 shows one embodiment of a cross-sectional view of the earth and corresponding data acquisition, recording and analysis system.

Referring to FIG. 2, there is shown a cross-sectional view of the earth in the vicinity of well bores 20 and 30, including geologic formations 1, 3, 5 and 7, with interfaces 2, 4 and 6 between geologic layers. A hydraulic fracturing operation is shown in progress in wellbore 30. Under the control and direction of well operation control center 32, hydraulic fracturing fluid is pumped into wellbore 30 at high pressure through pipe 34. The high pressure of the pumping operation forces fracturing fluid out of the wellbore 30 and through perforations 36 in pipe 34 into hydrocarbon producing geologic formation 5. As the fracturing fluid flows outwardly 40 from wellbore 30 and into geologic formation 5, the high pressure of the fluid fractures surrounding formation 5, causing one or more releases of seismic energy 44 at point of fracture 42. Seismic energy 44 propagates through subsurface 15 of the earth through geologic formations 1, 3, 5 and 7 as a series of acoustic wavefronts or seismic waves. Seismic wavefronts and energy 44 emitted at point of fracture 42 caused by the fracturing of geologic formation 5 by the fracturing fluid are sensed by surface sensors 12 disposed along surface of the earth 8 and/or downhole sensors 22 disposed in well bore 20, and converted into electrical, optical and/or magnetic analog or digital signals. The electrical, optical and/or magnetic analog or digital signals generated by sensors 12 and 22 in response to sensing seismic energy or wavefront 44 are representative of the detected or sensed seismic energy, and are recorded as data by acquisition and recording system 10.

As further shown in FIG. 2, data acquisition, processing and interpretation/analysis system 18 comprises surface sensors 12 and downhole sensors 22 operably connected to data acquisition and recording system 10, and data processing computer 16 operably connected to data acquisition and recording system 10. Note that FIG. 2 shows only one of many possible embodiments of system 18 for acquiring, processing and interpreting/analyzing microseismic data in a well setting. According to one embodiment, data may be recorded, processed and analyzed or interpreted while fracturing is occurring, thereby permitting near-real-time monitoring of the fracturing process.

Data acquisition and processing configurations other than that shown in FIG. 2 may be employed. For example, only surface sensors 12 may be employed or only downhole sensors 22 may be employed, and downhole sensors may be employed in well bore 30 in addition to or instead of in well bore 20. Seismic sensors 12 and 22 may be deployed along surface 8 and in well bore 20 and/or well bore 30. Any suitable combination of surface sensors 12 and/or downhole sensors 22 may be employed. By way of example, sensors 12 and 22 may comprise one or a plurality of sensors, or arrays of sensors, and may be geophones, accelerometers, piezoelectric sensors, hydrophones, or any other suitable acoustic sensor. Note further that sensors 12 and/or 22 may comprise 1-, 2- or 3-mutually-othogonal axis sensors, geophones, hydrophones or accelerometers configured to generate electrical, magnetic and/or optical signals proportional to the displacement, velocity or acceleration of the earth at locations corresponding to sensors 12 and 22, where such displacement, velocity or acceleration is caused by seismic wavefront 44 arriving at the locations of sensors 12 and/or 22. Sensors 22 may be cemented in place permanently in well bore 20 or well bore 30, and thereafter used to acquire data for multiple projects. Sensors 22 may also be lowered into well bore 20 on wireline or cable 24. The electrical, magnetic or optical signals generated by sensors 12 and/or 22 are transmitted to data acquisition and recording system 10 by cable 14 and wireline or cable 24. In other embodiments, signals generated by sensors 12 and/or 22 are transmitted by wireless transmitters to a wireless receiver operably connected to data acquisition and recording system 10. In still other embodiments, the electrical, magnetic and/or optical signals generated by sensors 12 and/or 22 are stored as data in solid state or other memory or recording devices associated with one or more sensors 12 and/or 22. The memories or recording media associated with the recording devices may be periodically collected or polled, and the data stored therein uploaded to data acquisition and recording system 10.

Note further that system 18 may be employed in land, marine, off-shore rig, and transition zone settings. In addition, multiple data processing computers 16 may be employed, and/or multiple data acquisition and recording systems 10 may be employed.

Other embodiments include but are not limited to, the recording of the seismic waves created by the energy released by explosive charges during the perforation of wellbore 30. When wellbore 30 is cased with a metal pipe or casing, the casing must be perforated so that oil or gas may flow into pipe 34 and thence to the surface of the earth at wellhead 38. Small explosive charges are used to perforate the casing and create perforations 36 through which oil or gas may then flow.

Still other configurations and embodiments may be employed to locate, measure and analyze faults in the subsurface of the earth by microseismic detection and processing means, such as, for example, sensing, recording and analyzing seismic energy originating from naturally occurring events, such as slippage along faults, settling or tilting of the subsurface, earthquakes, and other naturally-occurring events.

Data recorded by data acquisition and recording system 10 is typically, although not necessarily, in the form of digitally sampled time series referred to as seismic traces, with one time series or seismic trace for each sensor 12 or 22. Each value in the time series is recorded at a known time and represents the value of the seismic energy sensed by sensors 12 and 22 at that time. The data are recorded over a period of time referred to as the data acquisition time period. The data acquisition time period varies depending on the objective of the seismic survey. When the objective of the survey is to monitor a fracturing operation, for example, the data acquisition time period may be in hours or even days. When the objective of the survey is to acquire data associated with perforating a well, the data acquisition time period is much shorter and may be measured, by way of example, in seconds or minutes.

The rate at which data are recorded for each of the channels corresponding to each of the sensors 12 and 22 may also be varied in accordance with the objectives of the survey, and the frequencies characteristic of the seismic energy generated at point of fracture 42, and seismic wavefront 44 as it propagates through subsurface 15 and to surface 8. For example, if frequencies less than or equal to 125 Hz are expected to be sensed or measured in acoustic wavefront 44, data may be sampled at a rate of 2.0 milliseconds ("ms") per channel to ensure that temporal aliasing does not occur. Other sample rates are also possible such as 0.25 ms, 0.5 ms, 1 ms, 4 ms, 8 ms, 16 ms, and so on.

It is usual to record more data than is required for a given survey objective. For example, when monitoring a fracturing operation, recording may begin several minutes before the fracturing operation is scheduled and continue until a time beyond which it is unlikely that any further energy will be released as a result of the fracturing process. Such a process may be used to record the ambient seismic field before and/or after fracturing, production, halt of production, or perforation operations.

Once the seismic data have been recorded, they must be processed and converted to produce a useful display of information. Examples of providing such displays of information may be found in the above-referenced '361 and '353 patents, where some SET data acquisition and processing techniques are described in detail. In at least some SET techniques and processes, the subsurface of the earth is subdivided into a 3D grid or volume, and the cells in the grid or volume are referred to as "voxels". A "voxel" or "volume element" is the 3D equivalent of a 2D "pixel" or "picture element". While various different algorithms may be used to transform the acquired data, the end result is typically the same: a series of SET spatial volumes are produced, where each SET spatial volume is associated with a given data subset, and each data subset corresponds to a given time window. The values corresponding to the voxels within the spatial volume represent the amount of energy emitted from each voxel during a given time window.

The energy emitted from each voxel during a given time window may be represented by different attributes of the data, including, but not limited to, semblance, amplitude, absolute amplitude, reflection strength (the amplitude of the envelope of the seismic wave), phase, frequency, and other attributes of seismic data that will be apparent to those skilled in the art.

The size of the cells in the grid, that is, the voxels, is chosen based on the size of the microseismic events to be imaged. The smaller the voxel, the finer the detail that may be distinguished in the subsurface, and therefore the locations of the microseismic events may be determined more accurately. However, increasing the number of voxels increases the computing time required to process the data. Also, the smaller the voxel, the less energy is emitted from any voxel over a given period of time, increasing the difficulty of identifying microseismic events. The size of the voxels is also related to the spacing of the sensors on the surface of the earth, because the smaller the detail to be resolved in the subsurface, the closer is the required spacing of the spatial sampling at the surface. Further, the geometry of the sensors and the spatial sampling introduce artifacts into the data, such that the energy from a microseismic event does not focus or image at a point, but rather is spread out around the actual hypocenter of the microseismic event. A smaller sensor spacing helps to reduce such artifacts.

Figure 3A:
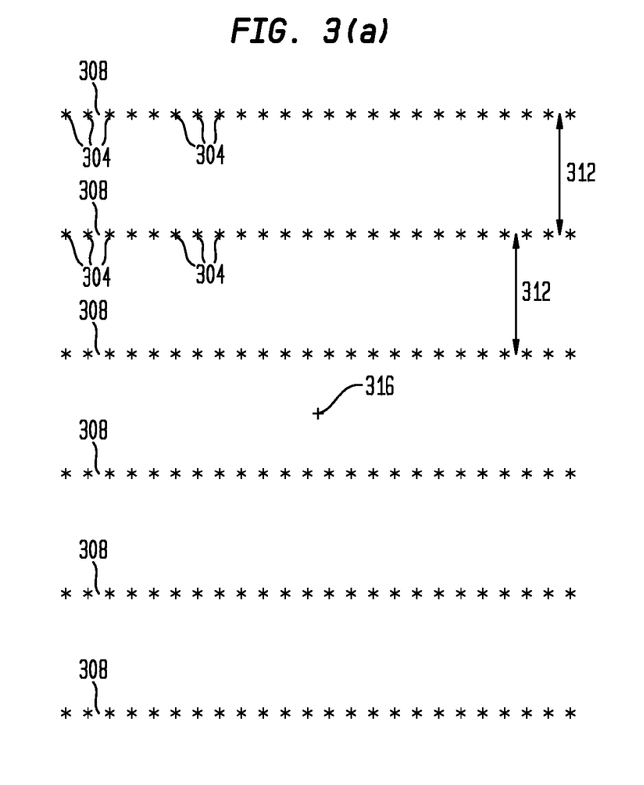
FIGS. 3(a) and 3(b) show embodiments of method of acquiring microseismic data using parallel seismic sensor lines.
Figure 3B:
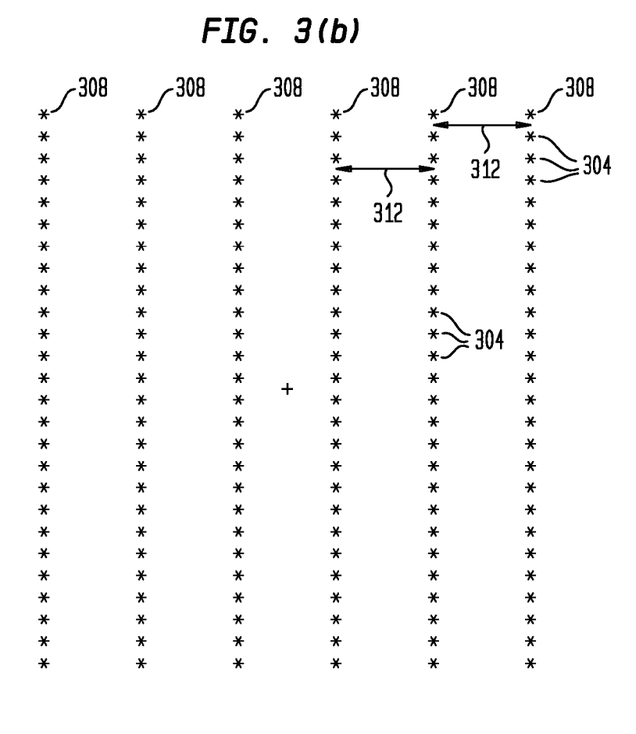

Referring now to FIGS. 3(a)-3(b), there are shown some embodiments of sensor geometry designs. FIG. 3(a) shows a plurality of sensor locations 304 substantially equally spaced along a plurality of sensor lines 308, at sensor line spacing 312, where the sensor lines are oriented substantially in an east-west direction and centered about well location 316. Although FIG. 3(a) shows the sensor lines in an east-west orientation, any orientation may be used, and FIG. 3(b) shows the same sensor geometry design with a north-south orientation. The orientation may be selected based on terrain, access to the area, permitting, and other factors. The orientation may also be selected based on a knowledge of the geology of the area. Sensor geometry designs may be similar to those employed in conventional seismic sensor geometry designs, and can be used to acquire both conventional and microseismic data. It is not uncommon for sensors to be laid out for conventional seismic surveys and then left in place for microseismic surveys as the exploration phase turns into the production phase of the development of the oil or gas field. It is also not uncommon for conventional seismic surveys and microseismic surveys to be conducted together, for example by collecting conventional seismic data with active seismic sources during the day, then collecting the passive microseismic data at night, when noise from traffic and machinery may be less.

Still referring to FIG. 3(a), there is shown a sensor geometry using a plurality of parallel sensor lines, which may be better at discriminating against noise in certain directions, especially noise traveling substantially parallel to the sensor lines, as inter-sensor spacing is in most cases less than sensor line spacing. Noise traveling perpendicular to sensor lines is not sampled nearly as well and is therefore more difficult to identify and remove. This problem can be avoided or mitigated by decreasing the spacing between the sensor lines, until in the ideal case it equals the inter-sensor spacing. This configuration is rarely achieved or used in practice. Surveying sensor locations before bringing in any equipment is time-intensive and costly. Setting out such a number of sensor stations on the ground adds further costs. There is a cost for the equipment, and there is a considerable cost in many surveys to clearing the brush and undergrowth. Such a configuration also requires a recording system capable of handling many channels of data simultaneously, or a system which stores the data at each sensor location for later collection. Brush and undergrowth must be cleared to allow the passage of the trucks carrying the sensors to a point reasonably close to where they are to be positioned. If the sensors are buried in shallow holes, or cemented in place, drilling trucks and other vehicles require access to the sensor lines. In microseismic surveying, such a tightly spaced sensor geometry design array is usually impractical.

Figure 4:
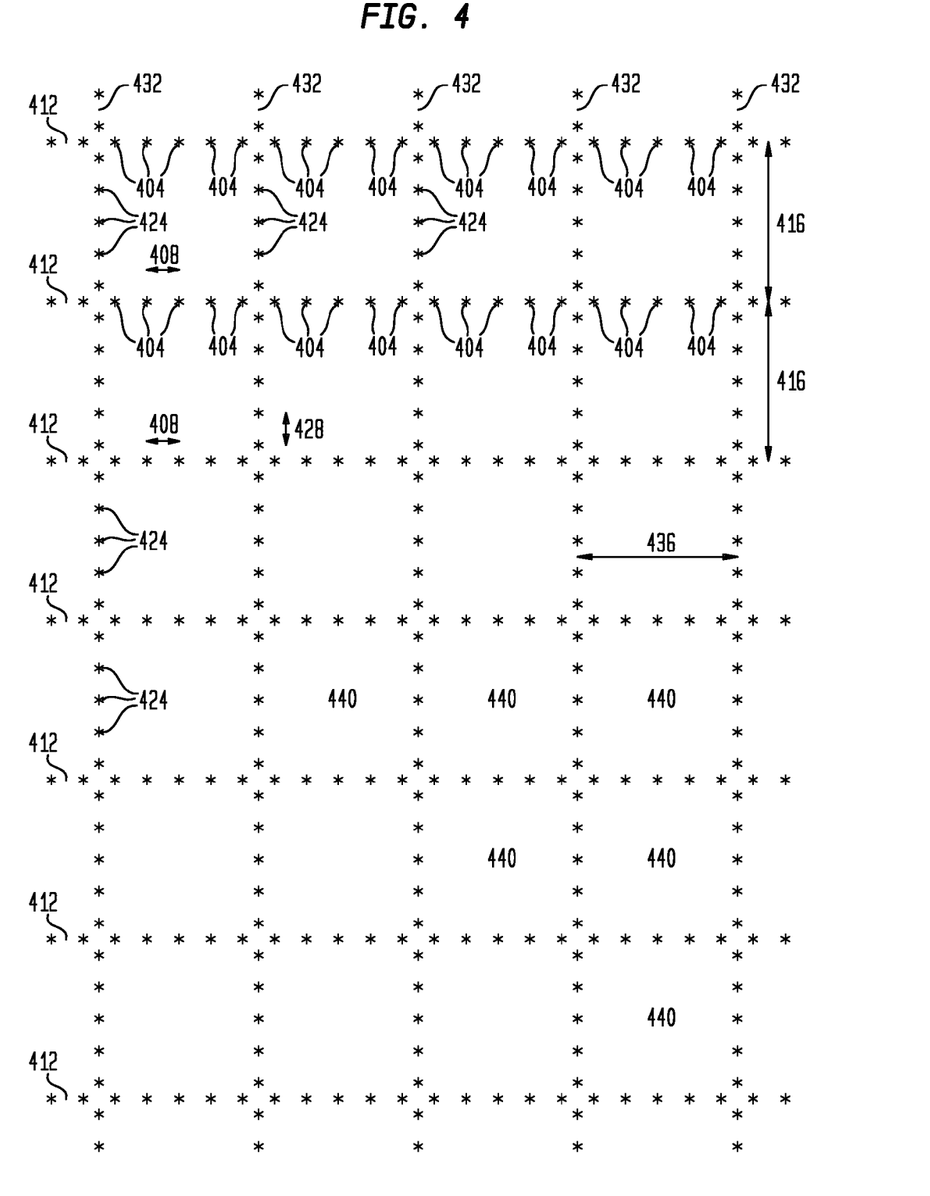
FIG. 4 shows one embodiment of a method of acquiring microseismic data using orthogonal seismic sensor lines.

Referring now to FIG. 4, there is shown another embodiment of a sensor geometry array. In such an embodiment, microseismic data is recorded using a sensor geometry array that offers adequate sampling of noise traveling in any direction, with an efficient and cost-effective use of the sensors and recording system. Shown in FIG. 4 is a first plurality of sensor locations 404, the first plurality of sensor locations 404 being substantially equally spaced at first sensor spacing 408 along a first plurality of sensor lines 412, the sensor lines in the first plurality of sensor lines 412 being substantially parallel to each other and substantially equally spaced from each other at first sensor line spacing 416. Also shown is a second plurality of sensor locations 424, the second plurality of sensor locations 424 being substantially equally spaced at second sensor spacing 428 along a second plurality of sensor lines 432, the sensor lines in the second plurality of sensor lines 432 being substantially parallel to each other and substantially equally spaced from each other at a second sensor line spacing 436. As shown in FIG. 4, the sensor lines in the second plurality of sensor lines 432 are substantially orthogonal to the sensor lines in the first plurality of sensor lines 412. This creates a grid of sensor location rectangles 440. According to some embodiments, first sensor spacing 408 and second sensor spacing 428 are substantially equal. In some embodiments, first sensor line spacing 416 and second sensor line spacing 436 are substantially equal. Note that although FIG. 4 shows the sensor lines oriented in east-west and north-south directions, any suitable orientation may be used to accommodate the terrain or to align the directions of the sensor lines with the geology of the subsurface of the earth.

Still referring to FIG. 4, in some embodiments the first plurality of sensor lines 412 and the second plurality of sensor lines 432 may be operably connected to separate recording systems 10 by cables 14. In other embodiments, the first plurality of sensor lines 412 and the second plurality of sensor lines 432 may be operably connected to one combined recording system 10 by cables 14. In other embodiments, data acquired at the first plurality of sensors 404 and the second plurality of sensors 424 are transmitted by wireless transmitters to at least one wireless receiver operably connected to at least one data acquisition and recording system 10. In yet other embodiments, data acquired at the first plurality of sensors 404 and the second plurality of sensors 424 are stored in flash memory or other electronic data storage devices, which are then collected and the data uploaded to at least one data acquisition and recording system 10 periodically, or upon completion of the survey.

Continuing to refer to FIG. 4, in some embodiments the first plurality of sensor lines 412 and the second plurality of sensor lines 432 intersect at a point equidistant from the adjacent sensor locations. In other embodiments, the first plurality of sensor lines 412 and the second plurality of sensor lines 432 intersect at a common sensor location. According to some embodiments, one line of the first plurality of sensor lines 412 and another line of the second plurality of sensor lines 432 intersect at a point on a well pad, thereby providing a 2-dimensional noise suppression capability for noise originating at or below the well pad, while still retaining the option of 3-dimensional noise suppression for noise originating elsewhere. An additional benefit of such embodiments is that the sensor geometry has a generalized design which is equally effective when new wells are drilled to develop the oil or gas field.

Still referring to FIG. 4, according to some embodiments an additional cost savings is realized when conventional seismic surveying has been carried out in the area by re-using as sensor lines those lines which have already been cleared of brush and obstacles and surveyed points created for the source lines.

Figure 5:
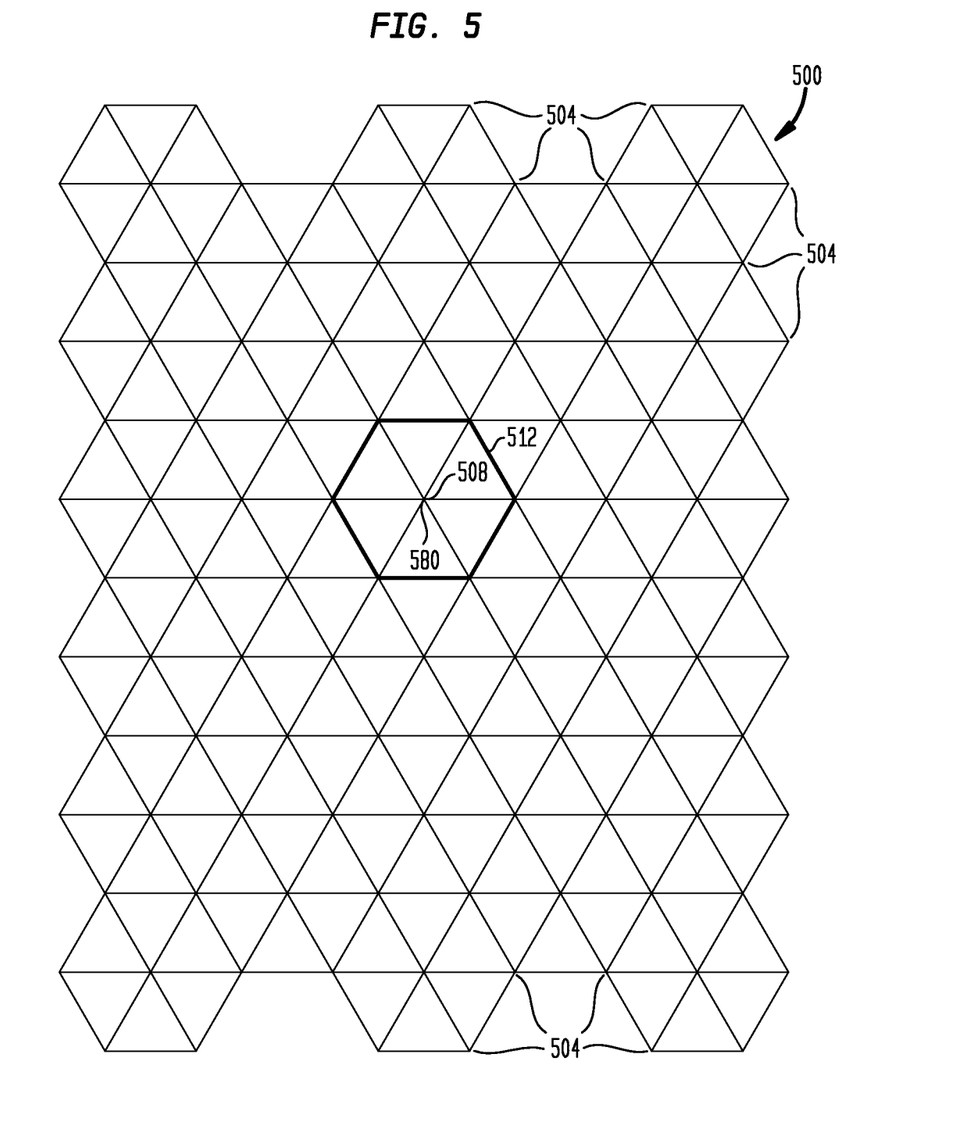
FIG. 5 shows one embodiment of an array for acquiring microseismic data using a hexagonal pattern of seismic sensors.

Referring now to FIG. 5, there is shown an embodiment in which a plurality of sensors 504 are arranged on or proximate surface of the earth 8 in a hexagonal pattern to form hexagonal array 500. In FIG. 5, the lines shown depict the relationships between the sensors and do not necessarily correspond to physical connections. As shown in FIG. 5, each sensor 504 is at center 508 of hexagon 512.

Figure 6:
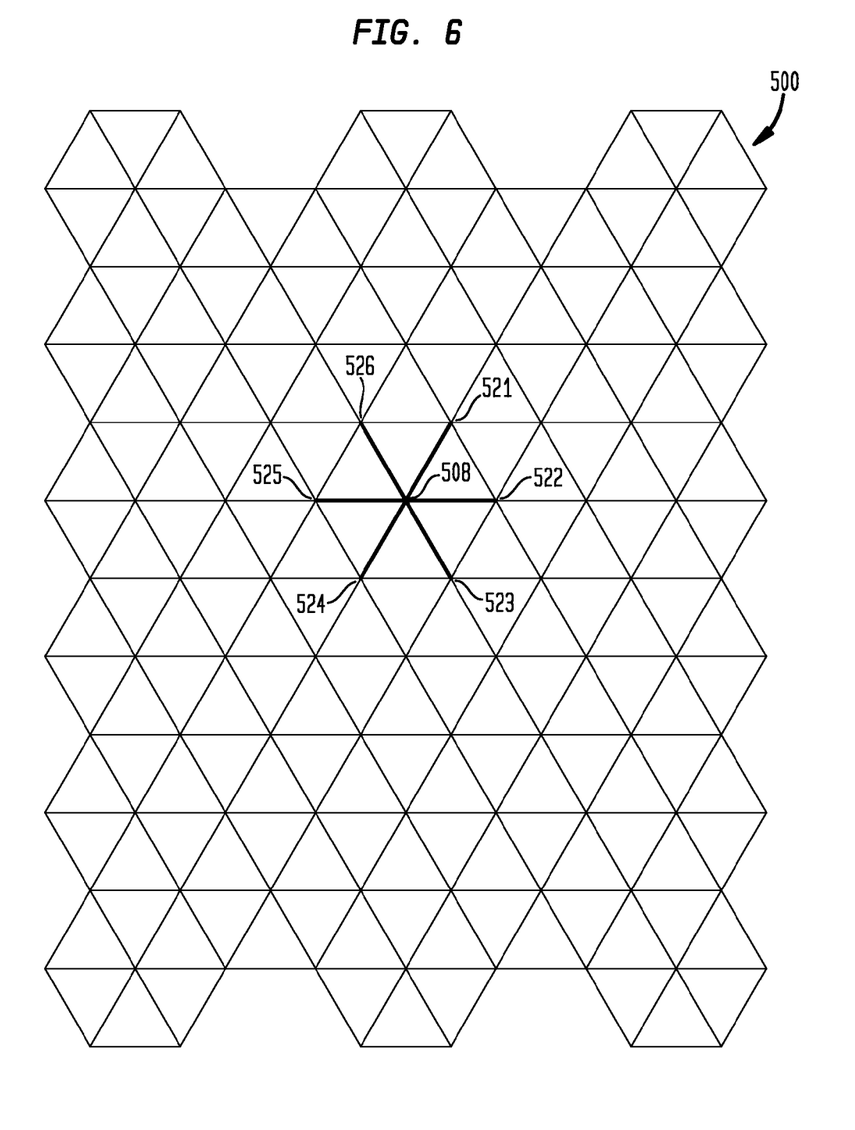
FIG. 6 shows one embodiment of seismic sensors arranged in a hexagonal pattern and equidistant from other seismic sensors.

Referring now to FIG. 6, each sensor 504 has six other sensors 521-526 substantially equidistant therefrom.

Figure 7:
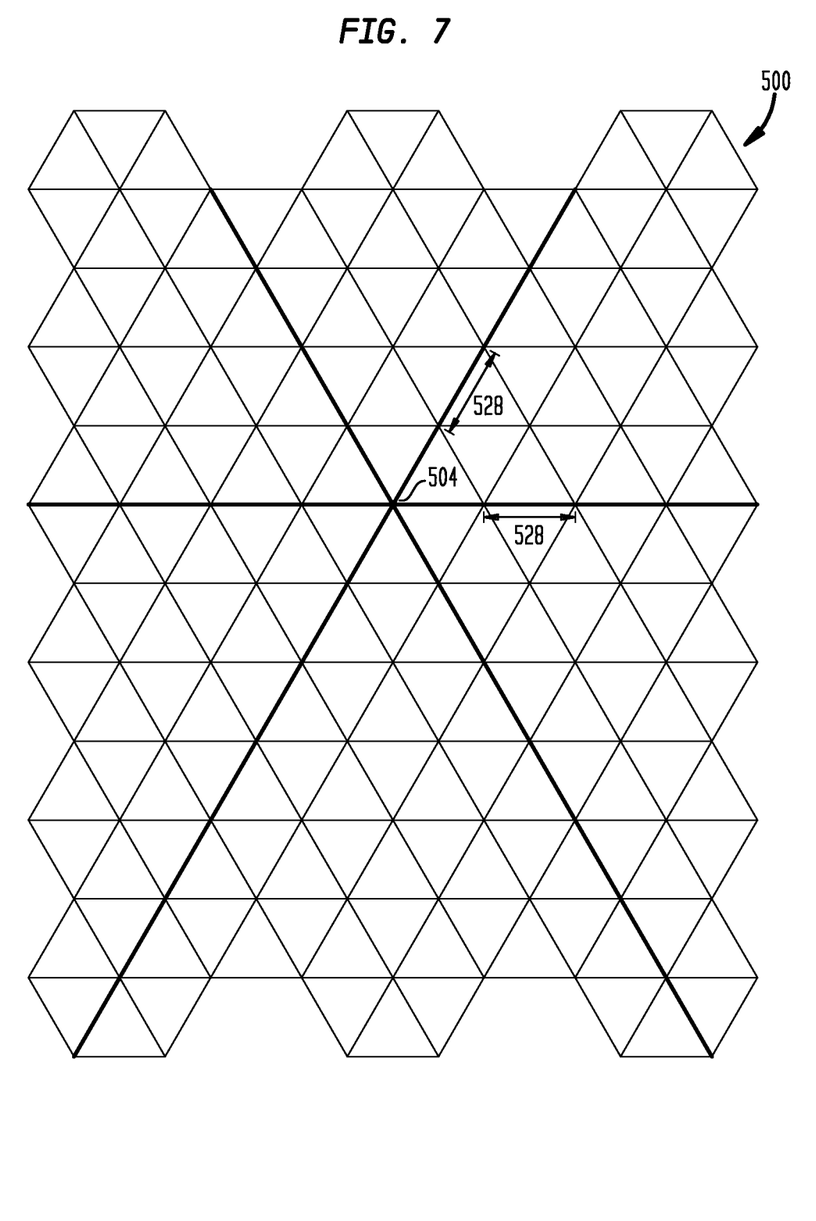
FIG. 7 shows another embodiment of seismic sensors in a hexagonal array is at a center of six substantially evenly spaced lines of seismic sensors.

Referring to FIG. 7, each sensor 504 has six different directions in which sensor lines radiate outwards with equally spaced sensors, the spacing being equal to the length of the side of hexagon 528. Such sensor lines are at 60 degree intervals and pass through the vertices of hexagon 512, the center of which is their intersection point.

Figure 8:
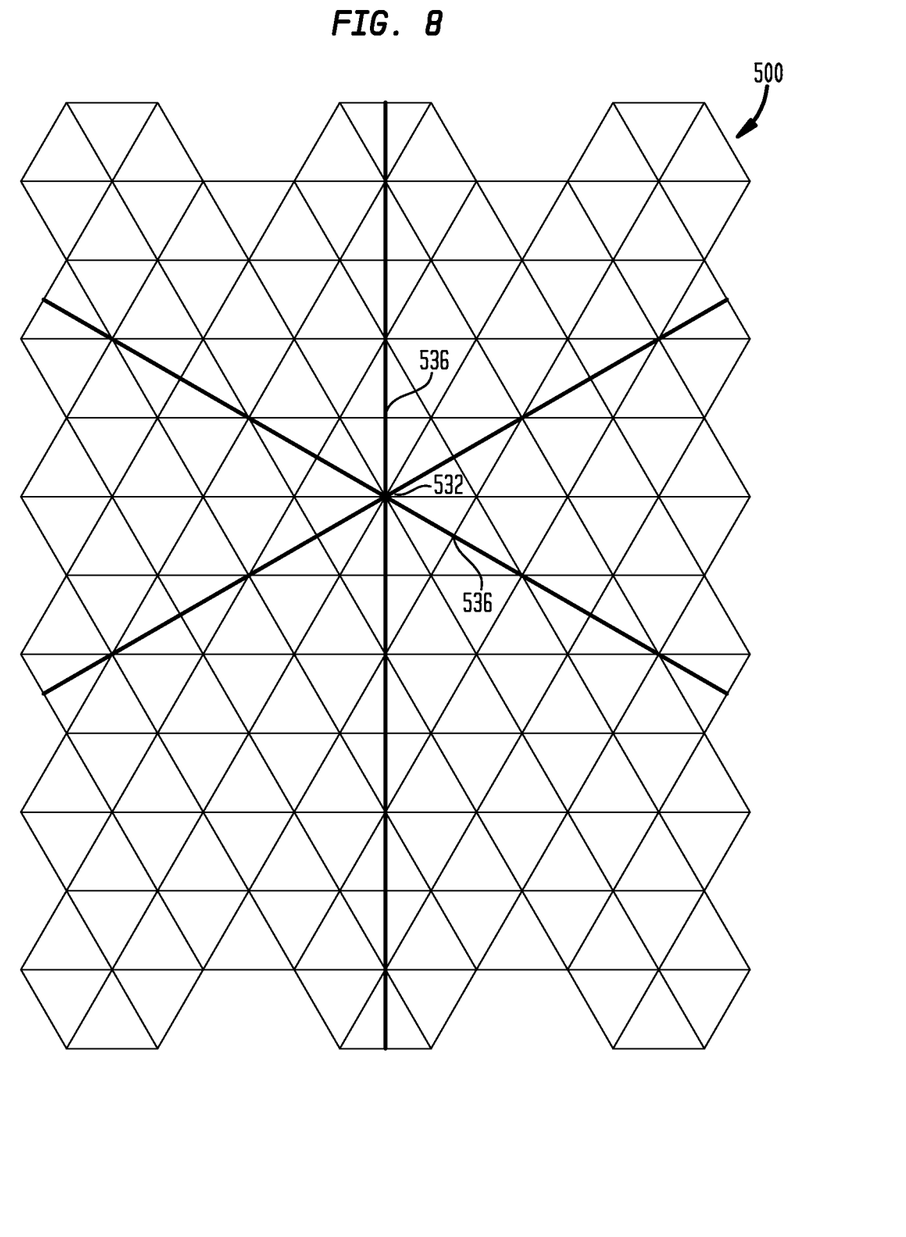
FIG. 8 shows yet another embodiment of seismic sensors in a hexagonal array at a center of six substantially evenly spaced lines of seismic sensors.

Further, as shown in FIG. 8, each sensor 504 has another line of equally spaced sensors extending from sensor location 532 through midpoint 536 of each side of the hexagonal array. These sensor lines are at 60 degree intervals, and are rotated 30 degrees from the lines through the vertices of hexagon 512, the center of which is their intersection point. The sensor spacing is equal to the height of hexagon 512, which is v3 times the length of the side of hexagon 512. From FIGS. 7 and 8, it can be seen that each sensor 504 has twelve directions, separated by 30 degree intervals, in which there is a line of regularly spaced sensors radiating outwards. Noise reaching the sensor from any direction can therefore often be attenuated by spatial filtering.

In some embodiments, hexagonal array 512 may be planned such that well location 580 is at sensor location 508 as is shown on FIG. 5. Any noise originating at the well can be effectively attenuated. Hexagonal array 512 provides the benefits of a radial array for that well. When a second or subsequent well is drilled, the location is at or close to another sensor location 504 so that a radial array is centered at the new well location. It is not necessary to set out a new array as long as the wells are within the area covered by hexagonal array 512. Further, when horizontal wells are drilled and hydraulically fractured, there are sensors above the path of the horizontal well, both radially from the vertical well and in a hexagonal pattern.

According to some embodiments, hexagonal array 512 has benefits in the analysis and correction of the azimuthally dependent variation in phase and amplitude seen in many microseismic events. Microseismic surveys rely on energy from small and usually unpredictable movements of the subsurface. Microseismic energy recorded by seismic sensors on the surface of the earth may have been released by movement of the subsurface along a fault/slip plane. Because the two sides of the fault plane move in opposing directions, the energy emitted on one side will be approximately opposite in phase to the energy emitted by the other side. For example, one side of the fault plane may move up, and the other side move down, producing what is referred to as a "double-couple" source. The energy release from such a source is very different from that released by a conventional seismic source, in which explosive, impulsive or other means are used to generate a seismic event which typically emits substantially the same energy in all directions. Double-couple energy varies greatly with direction or azimuth, and has very distinct azimuthally-dependent phase characteristics. P-waves and S-waves have different azimuthally-dependent phase characteristics, and travel at different velocities. The result is that the propagation of energy released by fault motion differs greatly depending on direction or azimuth.

In a surface microseismic array, sensors are arranged to cover an area of interest. Because the distance and direction from the microseismic event to each sensor is different, the signal from an event recorded at different sensor positions will be different, in both amplitude and phase. Commonly used methods of enhancing such signals, such as stacking multiple traces recorded at different locations or computing semblance generally do not work well. To produce an accurate result, it may be necessary to compute and apply azimuthally-dependent corrections for amplitude and phase before stacking or computing semblance. Some embodiments of such techniques are described in the U.S. patent application Ser. No. 13/277,178, entitled "Method for Imaging Microseismic Events Using an Azimuthally Dependent Focal Mechanism" to Diller et. al., filed on Oct. 19, 2011, which is hereby incorporated by reference in its entirety. An orthogonal sensor array or a hexagonal sensor array generally provides excellent data for computing azimuthal dependency, as they employ a dense and symmetric set of sensor locations proximate the surface of the earth. Energy emitted at a subsurface point in the survey area is recorded at multiple sensor locations with varying azimuths from the subsurface point. The data can be analyzed to determine the optimum azimuthal alignment, which allows azimuthally dependent phase and amplitude corrections to be applied to the data. Analysis can also reveal the fault or fracture orientation, tilt, and direction of first motion.

Hexagonal array 512 shown in FIG. 5 is only slightly more complex to set up than traditional arrays, especially when, as shown in FIG. 2, cables 14 are used to connect sensors 504. According to some embodiments, hexagonal array 512 is easier to implement when sensors 504 are connected to data acquisition and recording system 10 by wireless transmitters and receivers, or when electronic storage devices corresponding to sensors 504 store the data for collection and uploading to data acquisition and recording system 10 when the survey is complete. Expanding the area covered by the survey requires only adding extra sensors to extend the hexagonal pattern.

In some embodiments, sensors 504 may be arranged in a hexagonal pattern on or proximate the surface of the earth 8, and removed when the microseismic survey is complete. In other embodiments, sensors 22 may be buried in a hexagonal array of shallow boreholes 20 drilled for the purpose, or in other embodiments may be cemented in place in a hexagonal array of shallow boreholes 20 drilled for the purpose. Sensors 22 are then be left in place for further microseismic data acquisition as the oil or gas field is developed, including the monitoring of hydraulic fracturing operations performed on newly drilled wells.

Figure 9A:
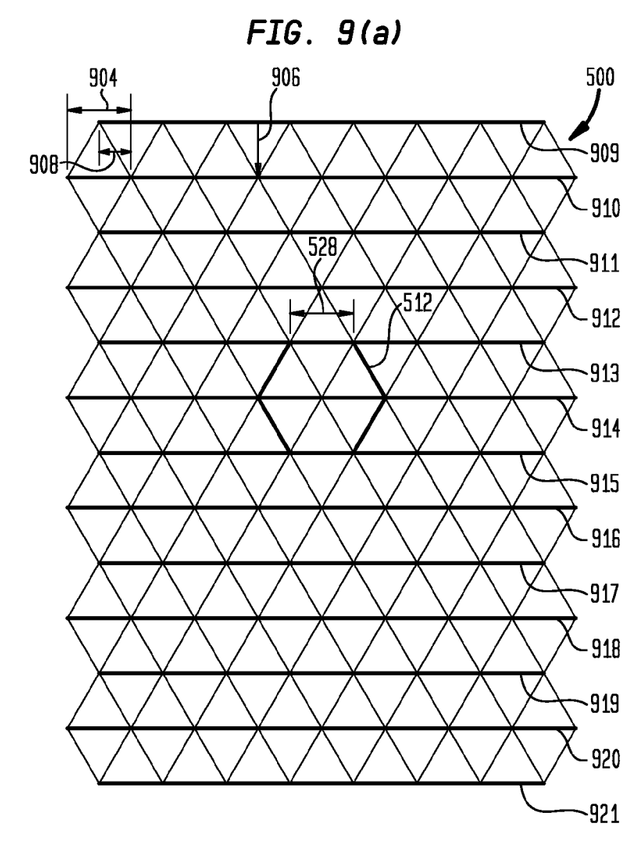
FIGS. 9(a) and 9(b) show embodiments of how seismic sensors might be placed in a hexagonal array for a seismic survey.

In FIG. 9(*a*) there is shown one embodiment of a hexagonal array surveyed and set in position using substantially straight and substantially parallel lines 909-921 of sensors 504. The spacing 904 of sensors 504 is equal to the predetermined length of side 528 of hexagon 512. It is common practice in seismic surveying to make the sensor line spacing an integer multiple or fraction of the sensor location spacing. This does not apply to the hexagonal array, where the sensor line spacing 906 is set equal to the height of hexagon 512, which is √3 times the length of the side of hexagon 512. The other change required for a hexagonal array is that alternate sensor lines 910, 912, 914, 916, 918 and 920 have their sensor locations shifted in a direction substantially parallel to the sensor line direction by distance 908 equal to one half of sensor spacing 904. Thus a hexagonal array may be easily surveyed and the sensors 504 set in position, even in embodiments in which sensors 504 are connected by cable 14. There is no need to survey hexagons, or zig-zag lines, or angles. In other embodiments, where sensors 504 are connected by wireless transmitters to a wireless receiver operably connected to data acquisition and recording system 10, setting up a hexagonal array is even easier than when laying out cables 14.

Figure 9B:
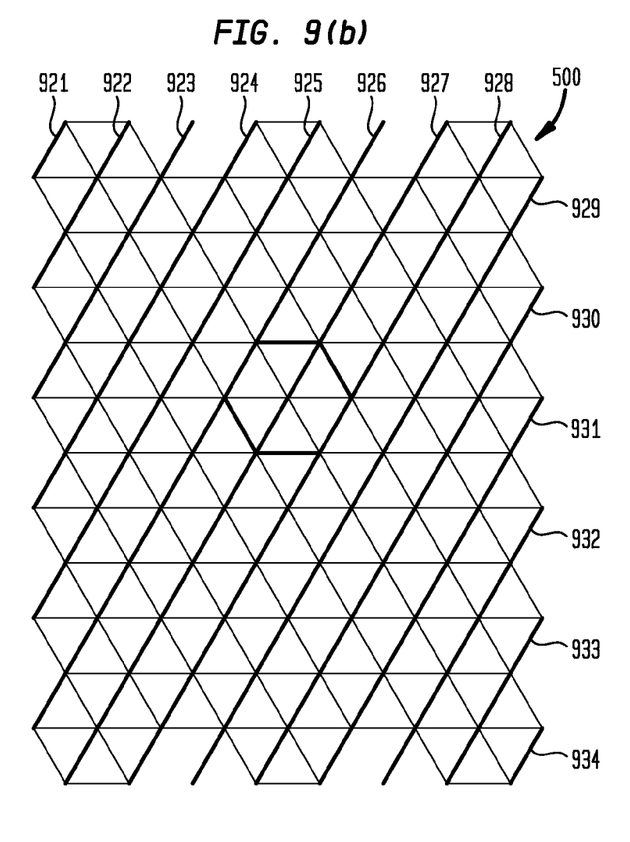

Still referring to FIG. 9(*a*), in some embodiments, there may be roads or tracks at some regular and parallel spacing, often on a grid pattern as frequently encountered in the western United States. If the spacing of the roads is close to the desired line spacing, the sensors may be set out along the roads in a chosen direction. In such embodiments, sensor line spacing 908 is the distance between the roads, and corresponds to the height of hexagon 512. Sensor spacing 904 is then computed as sensor line spacing 908 divided by √3. Referring now to FIG. 9(*b*), there is shown the same survey as in FIG. 9(*a*), but sensor lines 921-934 are surveyed at an angle of 60 degrees from those shown in FIG. 9(*a*). it will be apparent to those skilled in the art after having read and understood this specification and drawings that the sensors 504 will be located at the same positions and the survey will produce the same results for either embodiment. The choice of how the sensor locations are surveyed may be based on convenience, or on the existence of roads, tracks, or previously surveyed seismic sensor or source locations, including those from earlier microseismic and conventional seismic surveys.

Although the above description includes many specific examples, they should not be construed as limiting the scope of the invention, but rather as merely providing illustrations of some of the many possible embodiments of this method. The scope of the invention should be determined by the appended claims and their legal equivalents, and not by the examples given.

We claim:

1. A seismic energy sensor array for performing a microseismic survey, comprising a plurality of seismic energy sensors arranged at sensor locations on or proximate the surface of the earth in a hexagonal pattern;

a first set of six lines of equally spaced seismic energy sensors extending radially outward at sixty degree intervals from each of said plurality of seismic energy sensors, said equally spaced seismic energy sensors being positioned on said first set of six lines at vertices of hexagons centered about each of said plurality of seismic energy sensors; and a second set of six lines of equally spaced seismic energy sensors extending radially outward at sixty degree intervals from each of said plurality of seismic energy sensors, said equally spaced seismic energy sensors being positioned on said second set of six lines at vertices of hexagons centered about each of said plurality of seismic energy sensors, said second set of six lines of equally spaced seismic energy sensors being offset by thirty degrees from said first set of six lines of equally spaced seismic energy sensors, said first line of seismic energy sensors and said second line of seismic energy sensors extending from each of said plurality of seismic energy sensors providing twelve directions in which there is a line of equally spaced seismic energy sensors radiating outward from each of said plurality of seismic energy sensors to enable attenuation by spatial filtering of seismic noise reaching each of said plurality of seismic energy sensors.

2. A method of performing a microseismic survey, comprising detecting microseismic signals with a seismic energy sensor array comprising a plurality of seismic energy sensors arranged at sensor locations on or proximate the surface of the earth in a hexagonal pattern, a first set of six lines of equally spaced seismic energy sensors extending radially outward at sixty degree intervals from each of said plurality of seismic energy sensors, said equally spaced seismic energy sensors being positioned on said first set of six lines at vertices of hexagons centered about each of said plurality of seismic energy sensors and a second set of six lines of equally spaced seismic energy sensors extending radially outward at sixty degree intervals from each of said plurality of seismic energy sensors, said equally spaced seismic energy sensors being positioned on said second set of six lines at vertices of hexagons centered about each of said plurality of seismic energy sensors, said second set of six lines of equally spaced seismic energy sensors being offset by thirty degrees from said first set of six lines of equally spaced seismic energy sensors, said first line of seismic energy sensors and said second line of seismic energy sensors extending from each of said plurality of seismic energy sensors providing twelve directions in which there is a line of equally spaced seismic energy sensors radiating outward from each of said plurality of seismic energy sensors to enable attenuation by spatial filtering of seismic noise reaching each of said plurality of seismic energy sensors.

3. The method of claim 2, wherein at least one seismic energy sensor is positioned at a well location.

4. The method of claim 2, further comprising performing 2-dimensional noise filtering on the microseismic signals.

5. The method of claim 2, further comprising performing 3-dimensional noise filtering on the microseismic signals.

\* \* \* \* \*